United States Patent
Larmo et al.

(10) Patent No.: US 10,051,565 B2
(45) Date of Patent: Aug. 14, 2018

(54) WAKE-UP FOR MEASUREMENTS DURING DRX CYCLES

(71) Applicant: Telefonaktiebolaget L M Ericsson (publ), Stockholm (SE)

(72) Inventors: Anna Larmo, Espoo (FI); Bengt Lindoff, Bjärred (SE); Johan Rune, Lidingö (SE); Tuomas Tirronen, Helsinki (FI); Anders Wallén, Ystad (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 94 days.

(21) Appl. No.: 14/437,238

(22) PCT Filed: Oct. 23, 2013

(86) PCT No.: PCT/SE2013/051239
§ 371 (c)(1),
(2) Date: Apr. 21, 2015

(87) PCT Pub. No.: WO2014/070077
PCT Pub. Date: May 8, 2014

(65) Prior Publication Data
US 2015/0282076 A1    Oct. 1, 2015

Related U.S. Application Data

(60) Provisional application No. 61/719,714, filed on Oct. 29, 2012.

(51) Int. Cl.
*H04W 4/00* (2018.01)
*H04W 52/02* (2009.01)
(Continued)

(52) U.S. Cl.
CPC ... *H04W 52/0209* (2013.01); *H04W 36/0088* (2013.01); *H04W 76/28* (2018.02);
(Continued)

(58) Field of Classification Search
CPC ................. H04W 68/02; H04W 24/00
(Continued)

(56) References Cited

U.S. PATENT DOCUMENTS

2003/0144020 A1    7/2003  Challa et al.
2012/0120993 A1    5/2012  Lin et al.
(Continued)

FOREIGN PATENT DOCUMENTS

EP          0 788 255        8/1997
WO      WO 2010/033957       3/2010
WO      WO 2010033957 A2 *   3/2010  ............... H04L 1/20

OTHER PUBLICATIONS

3GPP TS 36.331 V11.5.0; 3rd Generation Partnership Project; Technical Specification Group Radio Access Network; Evolved Universal Terrestrial Radio Access (E-UTRA); Radio Resource Control (RRC); Protocol specification (Release 11), Sep. 2013.
(Continued)

*Primary Examiner* — Iqbal Zaidi
(74) *Attorney, Agent, or Firm* — Sage Patent Group

(57) ABSTRACT

Techniques for performing radio link measurements while a wireless device is operating in an extended DRX mode are disclosed. An example method, implemented by a wireless device in a wireless communication network, comprises waking up (510) in advance of a scheduled DRX on-time, and outside of any other scheduled DRX on-time, for at least one measurement interval, performing (520) radio link measurements during the at least one measurement interval, and determining (530) whether the wireless device is in an in-synch or out-of-synch status. In some embodiments, the
(Continued)

in-synch or out-of-synch status and/or a radio-link failure are selectively reported to upper layers of the mobile terminal's protocol stack, e.g., to an RRC layer.

26 Claims, 5 Drawing Sheets

(51) Int. Cl.
*H04W 36/00* (2009.01)
*H04W 76/28* (2018.01)

(52) U.S. Cl.
CPC .......... *Y02D 70/00* (2018.01); *Y02D 70/1262* (2018.01); *Y02D 70/21* (2018.01); *Y02D 70/23* (2018.01); *Y02D 70/24* (2018.01)

(58) Field of Classification Search
USPC ......... 370/252–311, 328–339; 455/458, 343, 455/374
See application file for complete search history.

(56) References Cited

U.S. PATENT DOCUMENTS

2012/0252517 A1  10/2012  Karampatsis et al.
2012/0257522 A1  10/2012  Adachi et al.
2012/0294169 A1*  11/2012  Chui ................. H04W 52/0274
                                                                370/252
2013/0237257 A1*  9/2013  Walke ................... H04W 68/00
                                                                455/458
2013/0301501 A1  11/2013  Olvera-Hernandez et al.

OTHER PUBLICATIONS

3rd Generation Partnership Project; Technical Specification Group Radio Access Network; Evolved Universal Terrestrial Radio Access (E-UTRA); Requirements for support of radio resource management (Release 12) (Note: This reference only includes Chapters 4, 5, 6, and 7.6, all of which have been uploaded as separate documents.), 2013.

International Search Report for International application No. PCT/SE2013/051239, dated Mar. 14, 2014.

PCT Written Opinion of the International Searching Authority for International application No. PCT/SE2013/051239, dated Mar. 14, 2014.

* cited by examiner

WAKE-UP FOR MEASUREMENTS DURING DRX CYCLES

PRIORITY

This nonprovisional application is a U.S. National Stage Filing under 35 U.S.C. § 371 of International Patent Application Serial No. PCT/SE2013/051239 filed Oct. 23, 2013, and entitled "WAKE-UP FOR MEASUREMENTS DURING DRX CYCLES" which claims priority to U.S. Provisional Patent Application No. 61/719,714 filed Oct. 29, 2012, both of which are hereby incorporated by reference in their entirety.

TECHNICAL FIELD

The present disclosure is generally related to wireless communications, and is more particularly related to improved techniques for performing mobility measurements in wireless communication networks.

BACKGROUND

Currently, in systems operating according to the specifications for Long Term Evolution (LTE) systems developed by the $3^{rd}$-Generation Partnership Project (3GPP), a wireless terminal in RRC_CONNECTED state is required to perform measurements on the physical layer. These measurements are used by the physical layer to determine whether the air interface is properly synchronized and whether the radio link is properly established, and to report the physical layer status to higher layers of the terminal's protocol stack. The higher layers need this information to communicate reliably with the eNodeB (3GPP terminology for a base station).

Typically, the wireless terminal does the measuring by listening to cell-specific reference signals (CRS) transmitted by the eNodeB and measuring the signal strength. The exact measurement requirements are tailored to work with different Discontinuous Reception (DRX) cycle lengths, so that the time period over which the measurements are done depend on the DRX cycle length and status. Details are provided in the 3GPP specification "Requirements for support of radio resource management," 3GPP TS 36.133, v. 11.1.0 (July 2012), available at www.3gpp.org. Similarly, when no DRX is used, there are requirements to measure the signal quality over a time period that is typically shorter than when DRX is used, where the exact length of the time period depends on whether the terminal ("user equipment," or "UE," in 3GPP terminology) is detecting out-of-synch or in-synch events.

Depending on these measurements and on preset threshold levels, the physical layer of the wireless terminal indicates to upper layers whenever it becomes out-of-synch or in-synch, depending on its earlier status. When a certain number of out-of-synch messages is received by the Radio Resource Control (RRC) layer, a timer is started and upon the expiration of this timer a radio link failure (RLF) is declared. (The RRC protocol for LTE systems is defined in "Radio Resource Control (RRC); Protocol Specification," 3GPP TS 36.331, v. 11.1.0 (September 2012), available at www.3gpp.org.) After RLF, the radio connection is typically either re-established or the terminal is moved to RRC_IDLE state.

Machine-to-machine (M2M) communication, sometimes referred to as machine-type-communication (MTC), is an increasingly popular paradigm, and M2M traffic and devices are envisioned to grow to huge numbers in the near future. For M2M communications, different optimizations to current technologies are needed, depending on the use case. One goal is to ensure the lowest possible power consumption, meaning that extensive or unnecessary signaling should be avoided and that the device should be kept in low-power state for long periods (i.e., having as few transmission and reception events as possible). In a typical implementation, a device, once not needed to receive or transmit data, goes into a deep sleep mode where as much as possible of the device's circuitry is turned off. In deep sleep, the power consumption can be on the order of a fraction of percent compared to high-power active transmission/reception mode. However, in order to reliably wake up at a certain time, the device needs to have some sort of low-power clock powered on. However, low power clocks are often inaccurate; hence, there is a risk of slipping in time and frequency during the deep sleep.

According to current specifications, measurements taken to detect an out-of-sync condition are spread over several DRX cycles. To minimize power consumption in an M2M device, it is desirable to lengthen the DRX cyte times. However, if the DRX cycle length is increased and is considerably longer than the current maximum, e.g., in excess of two minutes, and if the radio measurements discussed above are done over many DRX cycle lengths, as currently specified, then the device's synchronization status and actual radio link failure cannot be detected in a timely manner. The number of snapshots used for a reliable measurement is already quite small, i.e., on the order of five snapshots, with each snapshot being taken over a short time interval on the order of a few subframes (2-5 milliseconds). Using fewer snapshots for a measurement will produce unreliable measurements, e.g., due to fading. As a result, simply reducing the number of snapshots so that a measurement is taken over a reduced number of DRX cycle lengths would not work well.

Accordingly, improved solutions are needed for handling measurements in the context of extended DRX cycle lengths.

SUMMARY

For long DRX cycles, the air interface is out-of-synch most of the time, since the device is in sleeping mode and does not listen to the downlink reference symbols at all. This can result in a loss of proper time synchronization and frequency synchronization, due to the low-power, low-accuracy clock typically used during sleep mode. As a result, when a wireless terminal wakes up to listen for a downlink scheduling assignment in the next DRX active period, as determined by the DRX cycle length, it may not have enough time to synchronize to the network node and to detect the radio signal quality or re-establish the radio link properly. This in turn can lead to much unneeded signaling and a waste of resources.

According to several embodiments of the techniques detailed herein, a wireless terminal, while in a discontinuous receive (DRX) state, wakes up in advance of a known DRX active period and performs radio link measurements using a shorter measurement cycle than the DRX or paging cycle used otherwise. Furthermore, generally looser measurement requirements may be applied than are currently specified. In some cases, the wake-up procedure is defined entirely by system specifications, in which case the details of the procedure are pre-defined in the mobile terminal. Alternatively, one or more wake-up parameters can be signaled from the network node.

Embodiments of the presently disclosed techniques thus include methods, in a wireless device, as well as wireless device apparatus adapted to carry out one or more of these methods. An example method, implemented by a wireless device in a wireless communication network, comprises: waking up in advance of a scheduled DRX on-time (and outside of any other scheduled DRX on-time) for at least one measurement interval; performing radio link measurements during the at least one measurement interval; and determining whether the wireless device is in an in-synch or out-of-synch status. In some embodiments, the in-synch or out-of-synch status is selectively reported to upper layers of the mobile terminal's protocol stack, e.g., to an RRC layer.

In some embodiments, the method further comprises determining whether or not a radio link failure has occurred, based on the radio link measurements, and initiating a re-establishment of the radio link in response to determining that a radio link failure has occurred. In some embodiments, the method further comprises adapting subsequent wakeup times and/or subsequent measurement processes based on the results of the radio link measurements. Various approaches for performing the measurements and/or determining in-synch or out-of-synch status are detailed below.

Of course, the present invention is not limited to the above features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
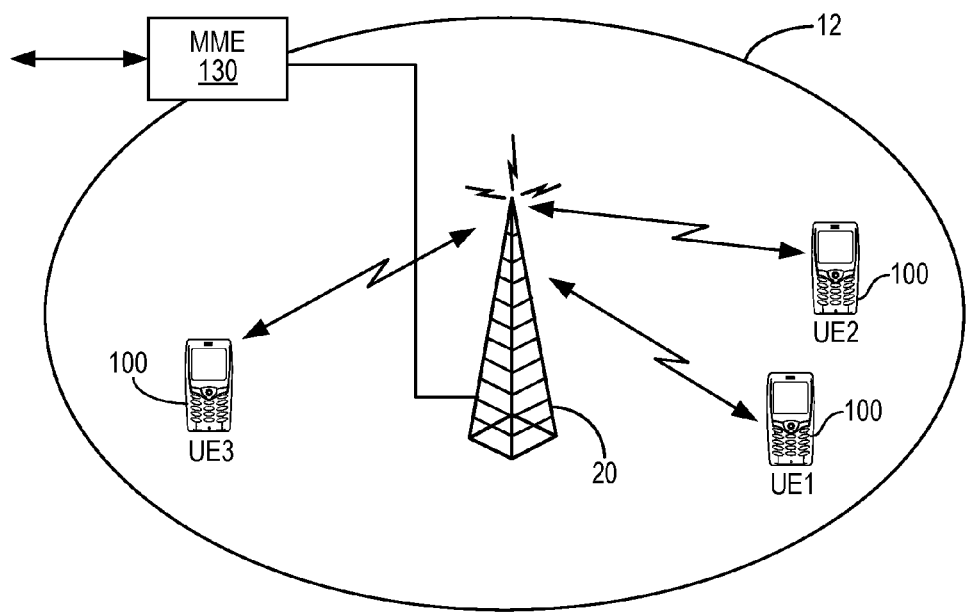
FIG. 1 is a schematic diagram illustrating an example wireless network in which the disclosed techniques may be applied.

Referring now to the drawings, FIG. 1 illustrates an exemplary mobile communication network for providing wireless communication services to mobile terminals 100. Three mobile terminals 100, which are referred to as "user equipment" or "UE" in 3GPP terminology, are shown in FIG. 1. The mobile terminals 100 may comprise, for example, cellular telephones, personal digital assistants, smart phones, laptop computers, handheld computers, machine-type communication/machine-to-machine (MTC/M2M) devices or other devices with wireless communication capabilities. It should be noted that the term "mobile terminal," as used herein, refers to a terminal operating in a mobile communication network and does not necessarily imply that the terminal itself is mobile or moveable. Thus, the term as used herein should be understood to be interchangeable with the term "wireless device," and may refer to terminals that are installed in fixed configurations, such as in certain machine-to-machine applications, as well as to portable devices, devices installed in motor vehicles, etc.

The mobile communication network comprises a plurality of geographic cell areas or sectors 12. Each geographic cell area or sector 12 is served by a base station 20, which is referred to as an eNodeB in the context of an LTE radio access network, formally known as the Evolved Universal Terrestrial Radio Access Network, or E-UTRAN. One base station 20 may provide service in multiple geographic cell areas or sectors 12. The mobile terminals 100 receive signals from base station 20 on one or more downlink (DL) channels, and transmit signals to the base station 20 on one or more uplink (UL) channels.

In an LTE network, base station 20 is an eNodeB and may be connected to one or more other eNodeBs via an X2 interface (not shown). An eNodeB is also connected to an MME 130 via an S1-MME interface, and may be connected to one or more other network nodes, such as a Serving Gateway (not shown).

For illustrative purposes, several embodiments of the present invention will be described in the context of a EUTRAN system. Those skilled in the art will appreciate, however, that several embodiments of the present invention may be more generally applicable to other wireless communication systems.

Figure 2A:
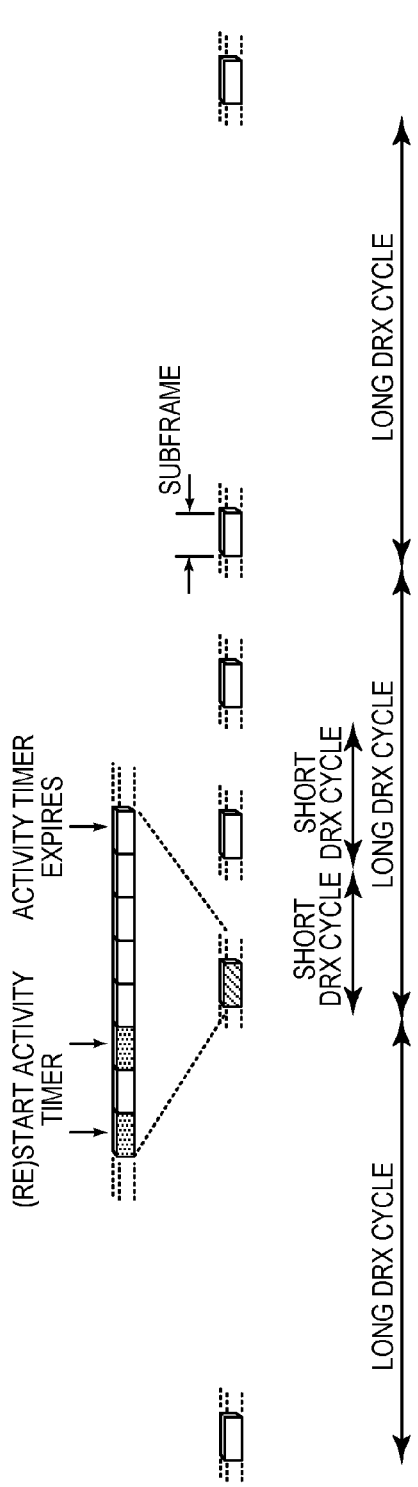
FIG. 2 illustrates a "normal" DRX cycle and an extended DRX cycle.

FIG. 2A illustrates the basics of the discontinuous receive (DRX) scheme employed in LTE systems. The mobile terminal is configured with a long DRX cycle, and is optionally configured with an additional short DRX cycle. At the beginning of each long DRX cycle, the mobile terminal wakes up and monitors downlink control signaling in a single subframe. If there is nothing scheduled for the mobile terminal, it goes back to sleep, until the beginning of the next long DRX cycle. If there is data scheduled for the mobile terminal in the scheduled "on-time," then it is likely that the mobile terminal will be scheduled again in the near future. Thus, the mobile terminal starts and restarts an "inactivity timer" each time it is scheduled with data—the mobile terminal remains awake for as long as this timer is running.

Certain types of data, such as voice-over-IP data, are characterized by regular and repeated relatively short periods of transmission, followed by periods of little or no activity. To efficiently handle this sort of data, a second, "short" DRX cycle can be superimposed on the long DRX cycle, as shown in FIG. 1. The short DRX cycle might be configured to repeat at 20 millisecond intervals, for example, to accommodate the typical voice codec frame interval. A mobile terminal configured with a short DRX cycle normally follows its long DRX cycle, but then uses the short DRX cycle for a period of time after each period of activity.

Figure 2B:
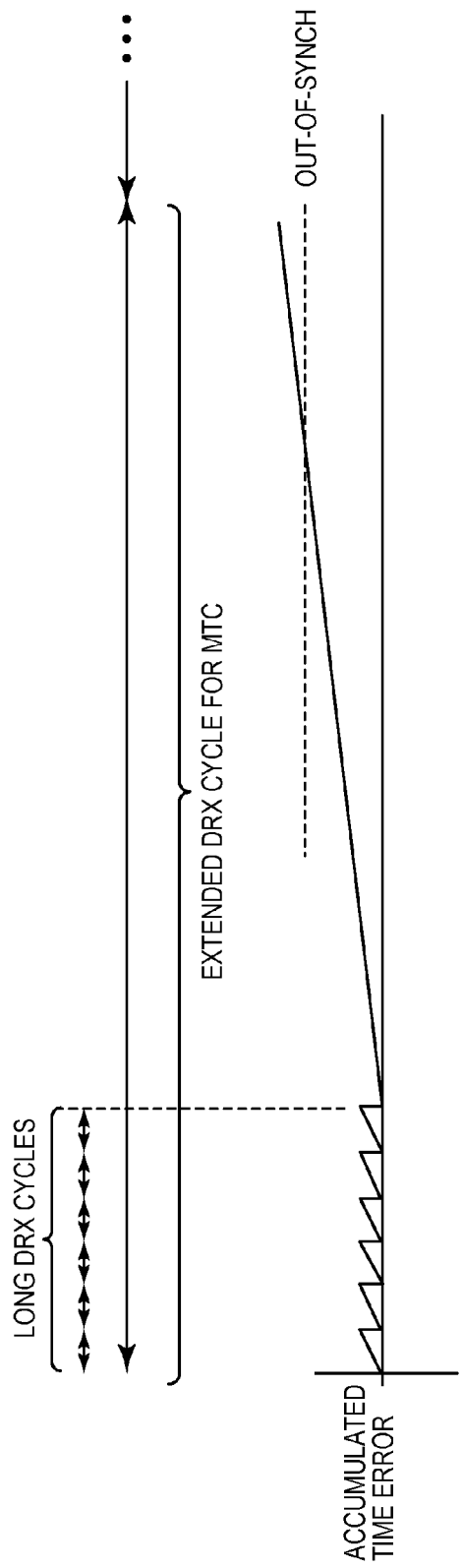

To minimize power consumption in an M2M device, it is desirable to lengthen the DRX cycle times. This "extended" DRX cycle may be several times greater than the longest DRX long cycle times, e.g., on the order of minutes. This is shown in FIG. 2B, where several long DRX cycles are shown, compared to an extended DRX cycle for machine-type communication (MTC). A possible problem with these extended DRX cycles is that the low-power clocks used during the sleep intervals can be inaccurate. Thus, as shown in the lower portion of FIG. 2B, the accumulated timing error between on-time intervals can grow to an extent where an M2M device loses synchronization (as indicated by the "out-of-synch" threshold shown in FIG. 2B, even when the device is installed in a fixed location and the signal strength is relatively good. Thus, if the DRX cycle length is increased and is considerably longer than the current maximum, say, in excess of two minutes, and if the radio measurements discussed above are done over many DRX cycle lengths, as currently specified, then the device's synchronization status and actual radio link failure (RLF) cannot be detected in a timely manner.

The number of snapshots used for a reliable measurement is already quite small, i.e., on the order of five snapshots, each one taken over a time interval on the order of a few LTE sub frames (e.g., 2-5 milliseconds). As a result, simply decreasing the number of snapshots used for a measurement, so that a measurement result is obtained more quickly, would not produce reliable indications of the device's sync status. Accordingly, improved solutions are needed for handling measurements in the context of extended DRX cycle lengths.

For long cycles, then, the air interface may be out-of-synch most of the time, since the device is in sleeping mode and does not listen to the downlink reference symbols at all. This results in a loss of proper time synchronization and frequency synchronization, due to the use of a low-power, low-accuracy, clock during sleep mode. A naïve approach to solve this problem is to not disable the high-accuracy clock that is used for keeping time and frequency synchronization in active mode. However, this approach comes at the expense of higher sleep power than in the deep sleep case—in some cases the sleep power may be an order of magnitude higher than what is achievable with deep sleep. Therefore, such a solution is not feasible, especially not in M2M low-power scenarios.

All of this means that when the terminal wakes up to listen for downlink scheduling assignment in the next DRX active period determined by the DRX cycle length, it may not have enough time synchronize to the network node and to detect the radio signal quality or re-establish the radio link properly, which will likely leads to much un-needed signaling (due to possible RLF) and a waste of resources.

Even with the current LTE specifications, where the maximum DRX cycle length is as short as 2.56 seconds and where it is expected that 5 measurement snapshots should be performed before indicating an out-of-synch status, the total period over which these measurements are performed is 5*2.56 seconds, i.e., 12.8 seconds. This long measurement duration provides challenges from a mobility point-of-view.

According to several of the techniques disclosed herein, a mobile terminal wakes up in advance of a known DRX active period and performs radio link measurements using a shorter "measurement cycle" than the DRX or paging cycle used otherwise, which could be a very long cycle. Furthermore, generally looser measurement requirements are applied than currently specified. In some cases, the wake-up procedure is defined entirely by system specifications, in which case the details of the procedure are pre-defined in the mobile terminal. Alternatively, one or more wake-up parameters can be signaled from the network node.

In either case, a general procedure for the mobile terminal may proceed as follows. On every cycle, the terminal:

1. synchronizes the air interface, if necessary, (e.g., to compensate for excessive drift) including a frequency scan and/or cell search. Synchronization can be done prior to the first of one or more measurement cycles, and/or as an integral part of one or more of the measurement occasions. Note that this synchronization is performed using the primary and secondary synchronization signals (PSS/SSS), while measurements are performed using common reference symbols (CRS). Since PSS/SSS detection is more robust than PDCCH/PDSCH reception, a device may re-synchronize with respect to PSS/SSS, but nevertheless fail to successfully receive downlink data. For this reason, an out-of-sync is declared for measurement results corresponding to levels where PDCCH reception is expected to be poor (e.g., ≥10% block-error rate), even if synchronization to PSS/SSS is still possible.
2. uses a "measurement DRX cycle," like the current specifications dictate, to perform radio link measurements and to verify and indicate that the link is properly established or, alternatively, perform the measurements as is currently specified for the no-DRX scenario (estimated quality over 200 milliseconds for going out-of-synch, over 100 milliseconds for in-synch). The times to do such may be defined by the specifications or by wake-up parameters signaled in a setup procedure from the network node to the device.
3. at the paging occasion, receives the potential signal on the PDCCH, e.g., a downlink scheduling assignment and continues operation as required.

With this approach, the terminal can, before receiving the paging, determine the actual radio link status and properly indicate in-synch or out-of-sync to upper layers.

Figure 3:
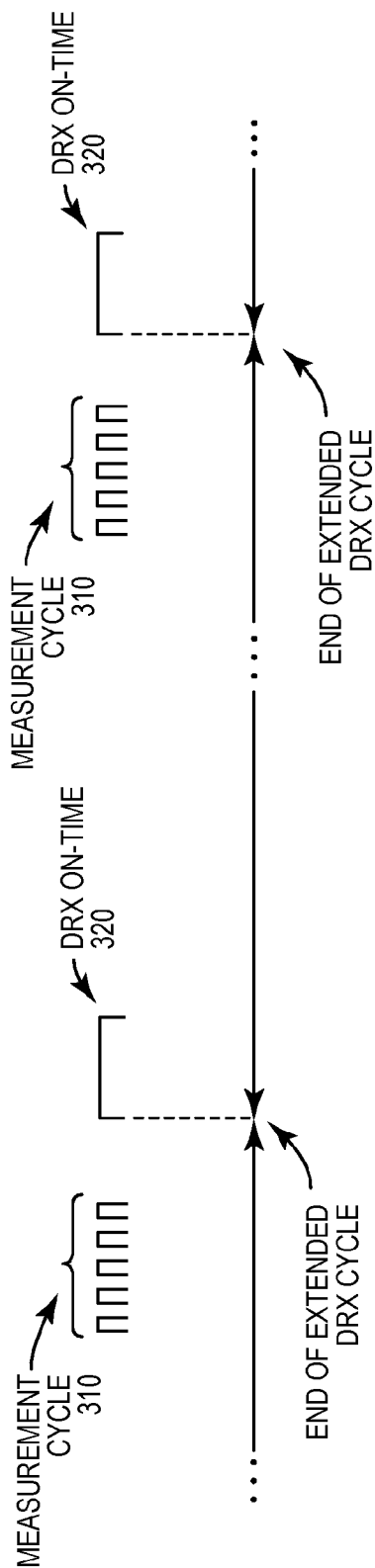
FIG. 3 illustrates a wake-up measurement interval, prior to a scheduled DRX on-time.

FIG. 3 is a timing diagram illustrating one embodiment of this approach. As seen in the figure, each of several extended DRX cycles begins with a scheduled DRX on-time 320. In advance of each scheduled DRX on-time, and outside of any other scheduled DRX on-time, the mobile terminal wakes up from a receiver sleep state for a measurement interval. These measurement intervals are illustrated in FIG. 3 as measurement cycles 310. The mobile terminal performs radio link measurements during the measurement intervals, and thus determines whether the wireless device is in an in-synch or out-of-synch state, prior to the scheduled DRX on-time. The mobile terminal's physical layer can then report the in-synch or out-of-synch status to an upper layer or layers of the mobile terminal's protocol stack, e.g., to a Radio Resource Control (RRC) layer. The physical layer may also report a radio link failure (RLF) to the upper layer, thus permitting the mobile terminal to initiate a re-establishment of the radio link.

In some embodiments, the measurement cycle 310 may include several "snapshots." In FIG. 3, five snapshots are shown. Between each of the respective snap shot the wireless device may turn off all or part of the radio receiver circuitry (e.g., the analog front end circuits), to save power. The snapshots may be taken over a single, relatively short interval, such as over a 200 millisecond interval. Alternatively, one or more snapshots may be taken for each of several periodic measurement intervals, e.g., according to a short DRX cycle time configured for the mobile terminal, or one of several possible short measurement cycles.

The technique illustrated in FIG. 3 provides several advantages. When a mobile terminal stays in RRC_CONNECTED state for long periods and the DRX cycle is considered to be long (here, "long" refers to time periods longer than the maximum DRX cycle of 2.56 seconds, as currently specified in 3GPP specifications for LTE, e.g., including cycle times on the order of minutes in length), it is beneficial to consider the radio link status before entering the active phase, i.e., before listening for possible grants or assignments on the physical downlink control channel (PDCCH). Otherwise, a possible problem or a failure of the radio link cannot be properly detected before the communication is supposed to happen. With the current specifications, the time interval over which the measurements are supposed to be made to indicate the radio link status consists of several DRX cycle lengths. This means that when using the longer DRX cycles, the radio link status would be determined over several minutes worth of measurements, which might not indicate correctly the current status of the link and could lead to waste of resources in case of unexpected RLF.

Since a mobile terminal in DRX mode knows in advance which time instants it should use for listening to the PDCCH transmission, the terminal can wake up in advance to perform the measurements and address the status of the radio link. The time for measurements and synchronization may at least in part be defined by the standard and/or based on network parameters signaled from the network node to the device during a connection setup procedure. Different methods of properly addressing the link status may be envisioned. For example, in various embodiments and/or in various scenarios or circumstances the terminal may:

1. Wake up $T_{wake-up}$ milliseconds in advance and perform the measurements as specified currently in 3GPP TS 36.133 for no-DRX operation, and then continue in a manner that depends on the status of the radio link. In the current specifications, the minimum requirement is for measurement snapshots taken over 200 milliseconds period to indicate being out-of-synch. In some embodiments, the exact time instances to measure may be defined by standard or signaled from the network node. In between snapshots, the wireless device may turn off all or part of the radio receiver to save power.

2. Wake up in advance and enter a cyclic measurement process, where the measurements are performed as specified in 3GPP TS 36.133. Thus, in this option the measurements are performed in a manner similar to how they are performed when using DRX as currently specified. The DRX cycle length to be used for the cyclic measurement process could be chosen from the set of currently available options, in some embodiments. However, from an energy consumption point of view it would be beneficial to keep the total number of measurement snapshots as low as possible, i.e., a short total measurement interval. In some embodiments, the exact time instance to measure may be defined by standard or signaled from the network node.

Figure 4:
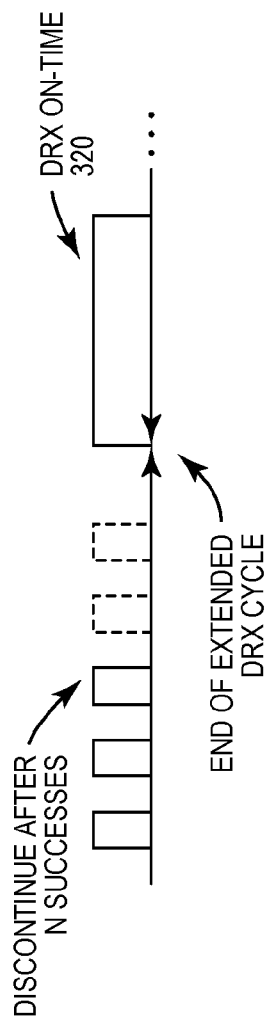
FIG. 4 is a timeline showing a measurement cycle prior to a DRX on-time.

3. Accept a single successful measurement as an indication of in-synch—at least if this is the first measurement—and then cancel the remaining measurement snapshots. If a measurement is unsuccessful, the UE continues to sample more snapshots. If the first snapshot is OK, then the UE is in-sync and cancels further measurements (in this series of up to, say, five measurement snapshots). This saves power, since the radio need not be turned on for further measurements, for this cycle. If the first snapshot is unsuccessful, on the other hand, then the UE continues with a second snapshot. After each snapshot the UE may combine the measurements to an intermediate tentative result and if such an intermediate tentative result is OK, then the UE is in-sync, and subsequent measurements may be canceled. Another approach is to only consider single snapshots individually, but to require more than one successful snapshot unless the first one is successful. This is shown in FIG. 4, where three successful snapshots in a row result in the discontinuing of further measurement snapshots. Still another variation could be that the UE is "happy," and thus cancels any further measurements, if two consecutive snapshots indicate in-synch, irrespective of where in the series of snapshots these two consecutive snapshots occur.

4. Perform a long-term adaptation by monitoring its own out-of-synch events in relation to elapsed time, thereby adapting to the inaccuracy and drifting characteristics of its internal low power clock. By tuning its own behavior, e.g., at what DRX cycle lengths it needs to start using early wakeup for proactive measurements and how many snapshots it should use, etc., the procedure may be optimized for each individual UE. This embodiment/addition is based on the uncertain assumption that there is some "reliability" in the inaccuracy of the internal low power clock, i.e., assuming it is useful to try to predict the amount of inaccuracy/drifting of the low power clock based on previous experiences of such drifting. For example, since clock drift is typically temperature-dependent, the drift at different temperature conditions can be recorded, stored, and then retrieved at subsequent wake-up occasions.

It should be appreciated that two or more of the several techniques described above may be combined, in several embodiments.

Depending on the measurements, the terminal declares either in-synch, out-of-synch, or nothing to the upper layers. If the terminal is out-of-synch, it needs to perform additional measurement cycles before the RRC declares RLF. In this case, a RRC re-establishment procedure is initiated. If security is not activated, then the terminal would move to RRC_IDLE. To account for the possible need of RRC re-establishment the terminal would need to wake up at least $T_{wake-up} = N310 \cdot T_{total\_meas\_time} + T310 + T311 T_{re-establish\_delay}$ seconds before the planned reception. The parameters N310, T310 and T311 are specified in 3GPP TS 36.331, and account for a number of received out-of-synch indications before RLF is indicated, a timer for declaring RLF, and a timer used during RRC re-establishment procedure, respectively. $T_{total\_meas\_time}$ is the time over which the measurements are done according to the techniques described above. $T_{re-establish\_delay}$ is specified in 3GPP TS 36.133, and is the delay within which the terminal is required to send RRC re-establishment request upon detecting the RLF. If the terminal is first out-of-synch and then indicates in-synch later, but before an intended reception, it can continue normal operation without the need for the RRC re-establishment procedure.

Figure 5:
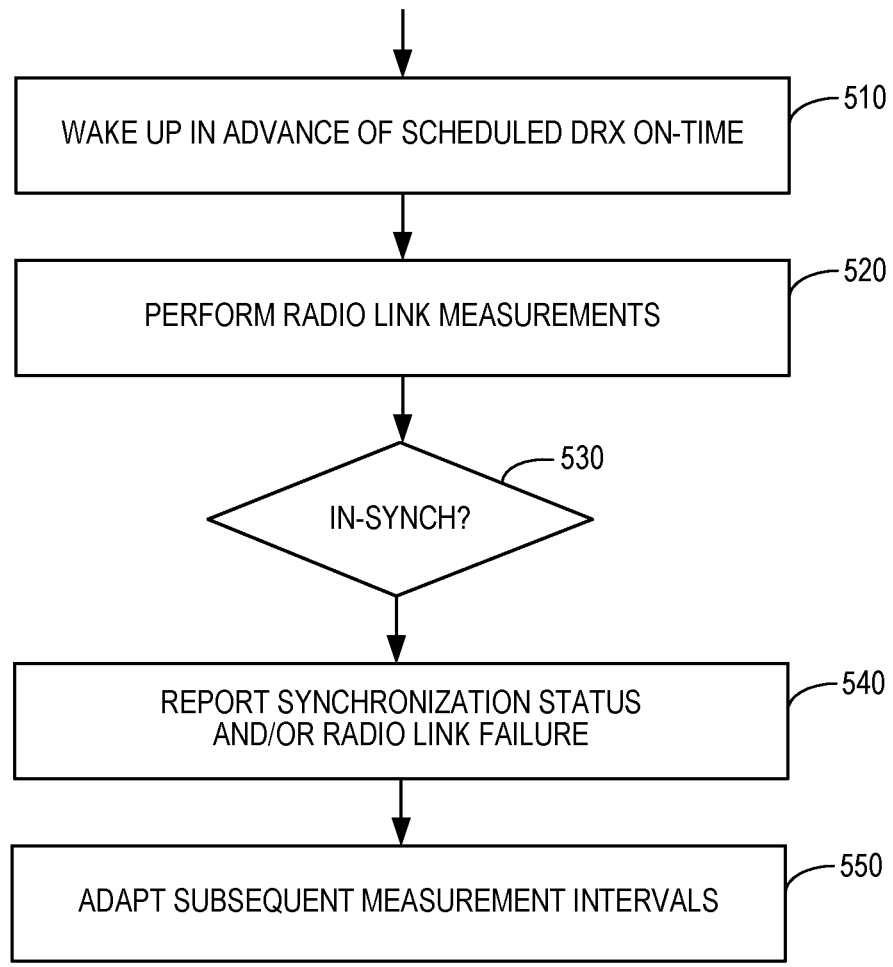
FIG. 5 is a process flow diagram illustrating an example method for performing radio link measurements.

FIG. 5 is a process flow diagram illustrating an example method according to several of the techniques described above. This method is implemented by a wireless device operating in DRX mode a wireless communication network. As shown at block 510, the wireless device, while in DRX mode, wakes up from a receiver sleep state for at least one measurement interval, in advance of a scheduled DRX on-time and outside of any other scheduled DRX on-time. As shown at block 520, the wireless device performs radio link measurements during the at least one measurement interval. Based on the radio link measurements, as shown at block 530, the wireless device determines whether the wireless device is in an in-synch or an out-of-sync status, prior to the scheduled DRX on-time.

As shown at block 540, the wireless device may also selectively report the in-synch or our-of-synch status for the wireless device to a layer higher than the physical layer, such as a radio resource control (RRC) protocol layer, based on determining the device's synchronization status. In some embodiments and/or under certain circumstances (e.g., repeated out-of-synch statuses), the wireless device may determine that a radio link failure (RLF) has occurred, based on the radio link measurements. A RLF failure may also be reported to an RRC protocol layer, in some embodiments, in the event that RLF is detected.

In some embodiments, the wireless terminal adapts subsequent measurement intervals occurring outside of any scheduled DRX on-times, based on the radio link measurements. This is shown at block 550, which is illustrated with a dashed outline to indicate that it this feature is "optional" in the sense that it need not appear in every wireless device that otherwise implements the technique illustrated in FIG. 5. In some embodiments, this adapting may comprise determining how many measurement snapshots to use for subsequent measurement intervals, based on the radio link measurements. In some of these or in other embodiments, this adapting may comprise determining whether or not early wakeup is needed for a given DRX cycle length, based on the radio link measurements.

In some embodiments, performing the radio link measurements comprises taking a plurality of measurement snapshots over a 200-millisecond period. The radio receiver may be turned off between measurement snap shots, to save power. In other embodiments, performing the radio link measurements comprises entering a cyclic measurement process in which measurements are taken at each of multiple intervals separated by a cycle length corresponding to a non-extended DRX mode having DRX cycles shorter than the extended-DRX mode. In some embodiments, radio link measurements are selectively discontinued for a measurement interval, and an in-synch status is reported, in response to determining that a predetermined number of measurements that are first in time during the at least one measurement interval are successful. This may be only a single measurement, in some embodiments. In some embodiments, an in-synch status might be reported and subsequent measurements in a particular measurement interval discontinued, in response to determining that a predetermined number of consecutive measurements are successful, even if those measurements are not the first in time. Note that a "successful" measurement is one that meets a predetermined requirement—for instance, a signal quality measurement, such as a signal-to-interference-plus-noise ratio (SINR) might be considered successful if it exceeds a predetermined threshold Qin, while a block-error rate (BLER), as measured on the Physical Downlink Control Channel (PDCCH), might be considered successful if below a predetermined threshold BLER_PDCCH_in. In some embodiments, a hypothetical PDCCH BLER may be used as in-sync/out-sync detector, where the hypothetical PDCCH BLER is based on SINR measurements made on common reference symbols (CRS) or synchronization signals (PSS/SSS), for instance, and a mapping function (determined by specification or by the wireless devices itself) between SINR and PDCCH BLER.

In some embodiments, one or more parameters relating to the measurement intervals may be signaled to the wireless device from a network node. Such parameters may include one or more of: a number of measurement intervals, a number of measurement snapshots, a length for the at least one measurement interval, and a measurement interval cycle time.

The embodiments described above and illustrated generally in FIG. 5 may be applied to DRX cycles of any length, but may be particularly advantageous for wireless devices operating in an extended-DRX mode having DRX cycles exceeding one minute in length.

Any of the methods described above can be used to ensure that the radio link is measured and that reestablishment is at least attempted, if necessary, before an intended reception event takes place. Other advantages of several embodiments of the techniques described herein include one or more of the following:

1. The techniques provide mechanisms to make the radio link monitoring work acceptably in conjunction with extended DRX cycles in RRC_CONNECTED state.
2. The techniques reduce the risk that a UE in extended DRX mode (in RRC_CONNECTED state) misses PDCCH signaling due to radio link failure.
3. In some of the techniques described above, the time interval over which measurements are made is set to the same value used in no-DRX operation. This means a fixed length period over which the measurement snapshot is made, and would provide reasonably low energy consumption.
4. In some of the techniques described above, such as the techniques in which a single successful measurement is accepted as an indication of in-synch, the measurement snapshots are effectively distributed more apart from each other, temporally, compared to other techniques, such as those in which measurements are performed in the same way as currently performed for DRX operation. This could be beneficial in some situations.

5. The several techniques described above provide mechanisms to limit the energy consumption of radio link monitoring for energy deprived UEs.

Still another advantage of some embodiments described herein is that the time instants for doing the in-sync measurements may be controlled by network node parameter settings. This makes it possible for the network node to have control over the times during which the device does in-sync measurements. The network node then has the possibility to turn off CRS and other common signals for periods of time outside the measurement intervals, e.g., in case of low load in the cell, thereby saving power in the network node as well.

Figure 6:
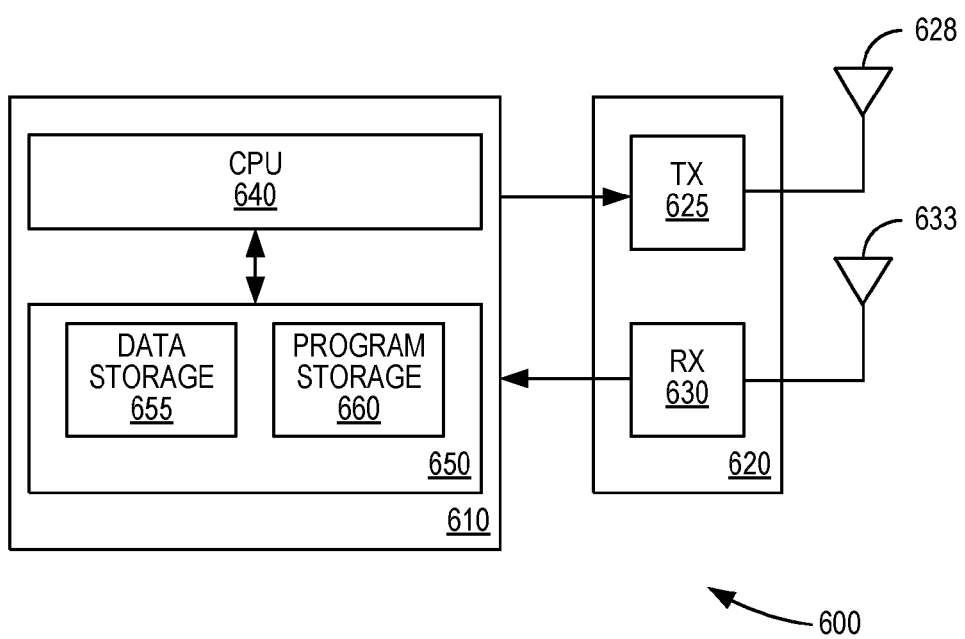
FIG. 6 is a block diagram illustrating components of a wireless device, according to some embodiments of the disclosed techniques.

The methods described above may be implemented using radio circuitry and electronic data processing circuitry provided in a mobile terminal. FIG. 6 illustrates features of an example mobile terminal 600 according to several embodiments of the present invention. Mobile terminal 600, which may be a UE configured for operation with a E-UTRAN, comprises a transceiver 620 for communicating with one or more base stations as well as a processing circuit 610 for processing the signals transmitted and received by the transceiver 620. Transceiver 620 includes a transmitter 625 coupled to one or more transmit antennas 628 and receiver 630 coupled to one or more receiver antennas 633. The same antenna(s) 628 and 633 may be used for both transmission and reception. Receiver 630 and transmitter 625 use known radio processing and signal processing components and techniques, typically according to a particular telecommunications standard such as the 3GPP standards for LTE. Because the various details and engineering tradeoffs associated with the design and implementation of such circuitry are well known and are unnecessary to a full understanding of the invention, additional details are not shown here.

Processing circuit 610 comprises one or more processors 640 coupled to one or more memory devices 650 that make up a data storage memory 655 and a program storage memory 660. Processor 640, identified as CPU 640 in FIG. 6, may be a microprocessor, microcontroller, or digital signal processor, in some embodiments. More generally, processing circuit 610 may comprise a processor/firmware combination, or specialized digital hardware, or a combination thereof. Memory 650 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices are well known and are unnecessary to a full understanding of the invention, additional details are not shown here.

Typical functions of the processing circuit 610 include modulation and coding of transmitted signals and the demodulation and decoding of received signals. In several embodiments, processing circuit 610 is adapted, using suitable program code stored in program storage memory 660, for example, to carry out one of the techniques described above for waking up to perform radio link measurements.

The mobile terminal 600 of FIG. 6 may also be understood as an example of a wireless device configured for operation in a wireless communication network and comprising several functional modules, each of which may be implemented using analog and/or digital hardware, or a processing circuit configured with appropriate software and/or firmware, or a combination thereof. For example, some embodiments comprise a transceiver module for communicating with one or more base stations in the wireless communication network and comprising a receiver module for operating in a sleep state between DRX on-times, when the wireless device is operating in a DRX mode, as well as a wake-up module for waking the receiver from sleep state for at least one measurement interval, in advance of a scheduled DRX on-time and outside of any other scheduled DRX on-time. The example wireless device further comprises a measurement module for performing radio link measurements during the measurement intervals, using the receiver module, and a determining module for determining whether the wireless device is in an in-synch status or out-of-synch status, prior to the scheduled DRX on-time. The modules in such a wireless device may be configured to carry out any of the variants of the techniques described above.

Examples of several embodiments of the present invention have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

What is claimed is:

1. A method in a wireless device operating in a wireless communication network, wherein the method comprises:
    while in a discontinuous receive, DRX, mode, waking up from a receiver sleep state for at least one measurement interval, in advance of a scheduled DRX on-time and outside of any previous DRX on-time;
    performing radio link measurements during the at least one measurement interval wherein performing radio link measurements during the at least one measurement interval comprises:
        selectively discontinuing the radio link measurements for the at least one measurement interval; and
        reporting an in-synch status in response to determining that a predetermined number of radio link measurements that are first in time during the at least one measurement interval are successful; and
    based on the radio link measurements performed during the at least one measurement interval, determining whether the wireless device is in an in-synch or an out-of-synch status, prior to the scheduled DRX on-time.

2. The method of claim 1, further comprising selectively reporting the in-synch or out-of-synch status for the wireless device to a radio resource control protocol layer, based on said determining.

3. The method of claim 1, further comprising determining whether or not a radio link failure has occurred, based on the radio link measurements.

4. The method of claim 3, further comprising reporting radio link failure to a radio resource control protocol layer if the wireless devices determines that a radio link failure has occurred.

5. The method of claim 1, further comprising adapting subsequent measurement intervals occurring outside of any scheduled DRX on-times, based on the radio link measurements.

6. The method of claim 5, wherein said adapting comprises determining whether or not early wakeup is needed for a given DRX cycle length, based on the radio link measurements.

7. The method of claim 1, wherein the DRX mode is an extended-DRX mode having DRX cycles exceeding one minute in length.

8. The method of claim 7, wherein said performing radio link measurements during the at least one measurement interval comprises entering a cyclic measurement process in which measurements are taken at each of multiple intervals separated by a cycle length corresponding to a non-extended DRX mode having DRX cycles shorter than the extended-DRX mode.

9. The method of claim 1, wherein said performing radio link measurements during the at least one measurement interval comprises taking a plurality of measurement snapshots over a 200-millisecond period.

10. The method of claim 1, wherein the predetermined number of measurements is one.

11. The method of claim 1, wherein said performing radio link measurements during the at least one measurement interval comprises selectively discontinuing radio link measurements for the at least one measurement interval and reporting an in-synch status in response to determining that a predetermined number of consecutive measurements are successful.

12. The method of claim 1, wherein one or more of a number of measurement intervals, a number of measurement snapshots, a length for the at least one measurement interval, and a measurement interval cycle time are based on information signalled to the wireless device from a network node.

13. A method in a wireless device operating in a wireless communication network, wherein the method comprises:
while in a discontinuous receive, DRX, mode, waking up from a receiver sleep state for at least one measurement interval, in advance of a scheduled DRX on-time and outside of any previous DRX on-time;
performing radio link measurements during the at least one measurement interval;
based on the radio link measurements performed during the at least one measurement interval, determining whether the wireless device is in an in-synch or an out-of-synch status, prior to the scheduled DRX on-time; and
adapting subsequent measurement intervals occurring outside of any scheduled DRX on-times, based on the radio link measurements;
wherein said adapting comprises determining how many measurement snapshots to use for subsequent measurement intervals, based on the raido link measurements.

14. A wireless device configured for operation in a wireless communication network and comprising:
a transceiver configured for communicating with one or more base stations in the wireless communication network and comprising a receiver circuit adapted to operate in a sleep state between discontinuous receive, DRX, on-times when the wireless device is operating in a DRX mode, and
one or more processing circuits,
wherein the processing circuits are adapted to:
while the wireless device is in the DRX mode, wake the receiver circuit up from sleep state for at least one measurement interval, in advance of a scheduled DRX on-time and outside of any previous DRX on-time;
perform radio link measurements during the at least one measurement interval, using the receiver circuit, wherein performing radio link measurements during the at least one measurement interval comprises:
selectively discontinuing the radio link measurements for the at least one measurement interval; and
reporting an in-synch status in response to determining that a predetermined number of consecutive radio link measurements are successful; and
based on the radio link measurements performed during the at least one measurement interval, determine whether the wireless device is in an in-synch or an out-of-synch status, prior to the scheduled DRX on-time.

15. The wireless device of claim 14, wherein the processing circuits are further adapted to report the in-synch or our-of-synch status for the wireless device to a radio resource control protocol layer, based on said determining.

16. The wireless device of claim 14, wherein the processing circuits are further adapted to determine whether or not a radio link failure has occurred, based on the radio link measurements.

17. The wireless device of claim 16, wherein the processing circuits are further adapted to report radio link failure to a radio resource control protocol layer, in the event that it is determined that a radio link failure has occurred.

18. The wireless device of claim 14, wherein the processing circuits are further adapted to adapt subsequent measurement intervals occurring outside of any scheduled DRX on-times, based on the radio link measurements.

19. The wireless device of claim 18, wherein the processing circuits are adapted to adapt subsequent measurement intervals by determining how many measurement snapshots to use for subsequent measurement intervals, based on the radio link measurements.

20. The wireless device of claim 18, wherein the processing circuits are adapted to adapt subsequent measurement intervals by determining whether or not early wakeup is needed for a given DRX cycle length, based on the radio link measurements.

21. The wireless device of claim 14, wherein the DRX mode is an extended-DRX mode having DRX cycles exceeding one minute in length.

22. The wireless device of claim 14, wherein the processing circuits are adapted to perform radio link measurements during the at least one measurement interval by taking a plurality of measurement snapshots over a 200-millisecond period.

23. The wireless device of claim 22, wherein the processing circuits are adapted to perform radio link measurements during the at least one measurement interval by entering a cyclic measurement process in which measurements are taken at each of multiple intervals separated by a cycle length corresponding to a non-extended DRX mode having DRX cycles shorter than the extended-DRX mode.

24. The wireless device of claim 14, wherein the processing circuits are adapted to perform radio link measurements during the at least one measurement interval by selectively discontinuing radio link measurements for the at least one measurement interval and reporting an in-synch status in response to determining that a predetermined number of measurements that are first in time during the at least one measurement interval are successful.

25. The wireless device of claim 24, wherein the predetermined number of measurements is one.

26. The wireless device of claim 14, wherein one or more of a number of measurement intervals, a number of measurement snapshots, a length for the at least one measurement interval, and a measurement interval cycle time are based on information signalled to the wireless device from a network node.

* * * * *